Nov. 16, 1971  C. C. BRUMMETT  3,619,931
AUTOMATIC FISH HOOKING DEVICE
Filed Sept. 15, 1969
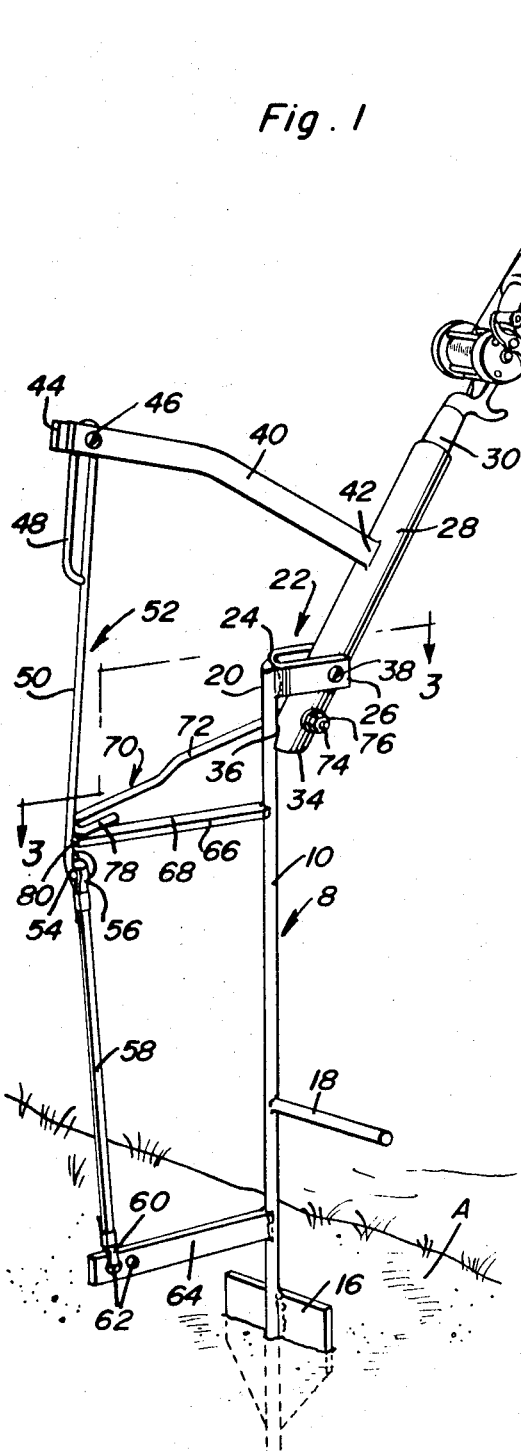
Fig. 1
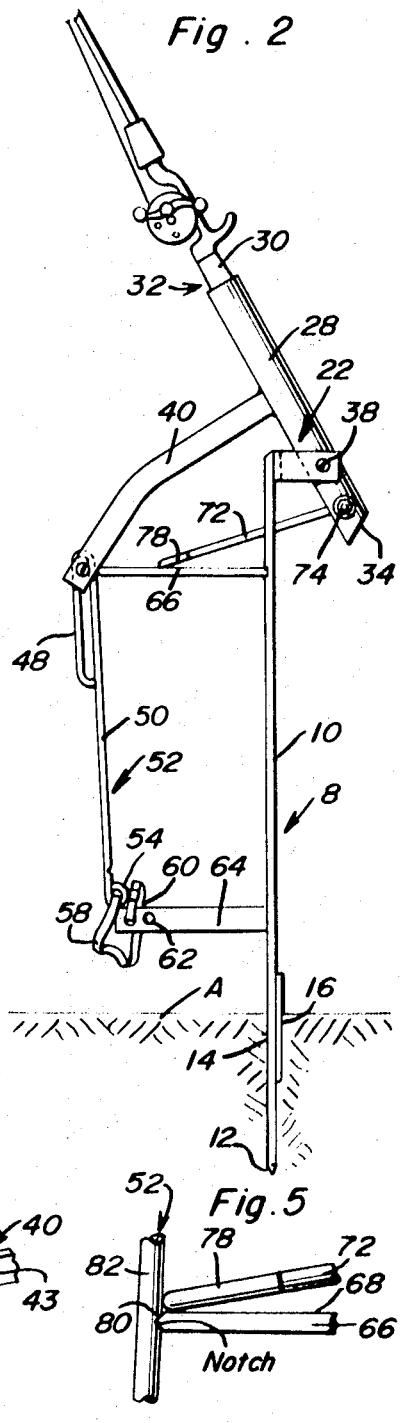
Fig. 2
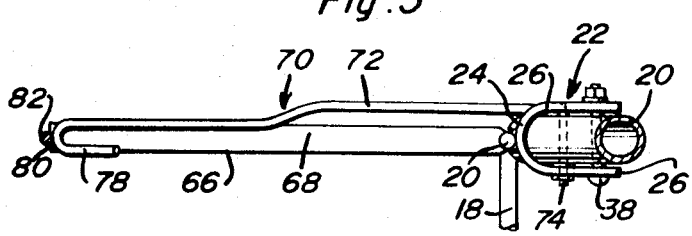
Fig. 3
Fig. 4
Fig. 5
Carl C. Brummett
INVENTOR.
BY Clarence A. O'Brien
and Harvey B. Jackson
Attorneys United States Patent Office 3,619,931
Patented Nov. 16, 1971

3,619,931
AUTOMATIC FISH HOOKING DEVICE
Carl C. Brummett, Forney, Tex., assignor to Hazel F. Brummett Shands, Brownsville, Tex.
Filed Sept. 15, 1969, Ser. No. 857,801
Int. Cl. A01k 97/00
U.S. Cl. 43—15  10 Claims

ABSTRACT OF THE DISCLOSURE

An automatic fish hooker comprising a portable vertically elongated standard whose pointed lower end has a turn-preventing anchoring plate. A U-bracket on the upper end serves to pivotally cradle a sleeve providing a socket-type holder for the handgrip of a fishing rod. A lateral arm on the pivoted holder serves as a setting handle. An operating connection between the handle and standard comprises a trip rod and an elastic band. Keeper means on the standard serves to position and releasably retain the trip member in a read-to-function position. A J-shaped trigger-rod has one end pivotally connected to a lower end of the sleeve and its free end shiftably supported on a keeper carried by and projecting laterally from the standard.

---

This invention relates to a portable easy-to-erect automatic fish hooker wherein a simple rod provides a significant part of a stand and is equipped with non-turning ground-penetrating and anchoring means at its lower end and a bracket at its upper end which supports a socket-type fishing rod holder and wherein novel bite-responsive means serves to provide reliably performing trigger and trip means.

A general object of the herein disclosed invention is to improve upon prior art spring-biased pull-actuated fish hookers such as, for example, Pat. 2,908,099 granted to G. V. Burke; and, a similarly-constructed rod holder and catcher, Pat. 2,944,361 granted to T. W. Coulter.

Briefly, the read-to-use automatic hooker comprises a stand which, in turn, embodies a vertically-elongated rod constituting a standard and having a pointed lower end and a suitably attached anchoring plate. This plate is fixed to the lower end portion above the pointed end and is adapted to be forcibly embedded in the ground in a manner to anchor and prevent turning of the standard. A U-shaped bracket is disposed at right angles to the vertical axis of the standard and is fixed to the upper end portion of the standard and projects in a forward direction and assumes a plane at right angles to the plane of the anchoring plate. A horizontally-disposed guide bar has one end fixed to the standard slightly below the plane of the U-bracket and has an outer end provided with a keeper notch. An elongated sleeve is open at the upper end and this sleeve provides a socket-type holder for the handgrip of a suitable fishing rod. The lower end of the sleeve is cradled and pivotally mounted between the legs of the bracket and has a lower terminal end portion which is adapted to abut a portion of the standard just below the level of the bracket and above the plane of the guide bar. A substantially J-shaped trigger has one end laterally bent and pivotally connected to a lower end portion of the sleeve and the other hooked end is arranged and is slidable back and forth atop the guide bar. The sleeve is provided intermediate its ends with a right-angularly disposed arm constituting a setting handle. A novel operating connection is provided between the free end of the handle and a lower end portion of the standard just above the plane of the anchoring plate. This operating connection is preferably in the form of a linking rod which has an upper end slidably connected with a free end of the handle. The lower end is slidable in the keeper notch and is releasably cooperable with the hooked end of the trigger. An elastic band is connected at an upper end to the lower end of the linking rod and has a lower end secured to the lower end portion of the standard.

Stated more specifically, the lower end of the rod holding sleeve depends below the U-bracket and has a terminal notched portion which when the hooker is set, has abutting contact with a predetermined portion of the standard, the J-shaped trigger being hingedly joined with the notched end of the sleeve in a position to permit the free hooked end to slide back and forth on the aforementioned guide member and in a position to cooperate with the keeper notch and to unseat the lower end of the trip rod by end-thrust pressure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a portable automatic fish hooker constructed in accordance with the principles of the invention and showing the same set up for use and also showing the coordinating position and relationship of the cooperating parts when the hooker is set to land a fish.

FIG. 2 is a view in side elevation on a slightly smaller scale showing the manner in which the aforementioned component parts appear when the trip member has been released from the aforementioned keeper notch.

FIG. 3 is a horizontal sectional view taken approximately on the plane of the irregular section line 3—3 of FIG. 1.

FIG. 4 is a fragmentary perspective view of the free end of the aforementioned setting handle showing the operating connection between the trip rod and handle.

And FIG. 5 is a fragmentary detail view showing the trip rod, keeper notch and hooked end of the aforementioned J-shaped trigger.

With reference first to FIGS. 1 and 2 in particular, it will be noted that the aforementioned portable easy-to-erect stand is denoted, generally stated, by the numeral 8. This stand is characterized by a rod 10 of requisite vertical height whose lower end 12 (FIG. 2) is pointed to penetrate the ground A. The portion of the rod just above the pointed end and denoted at 14 is provided on one side with a flat-faced stabilizing and anchoring plate 16. This plate is of the width suggested in FIG. 1 and has a pointed lower end and is adapted to be forced into the ground A. It functions to anchor the rod or standard and also prevents axial turning thereof. Just above the plate and fixed in place is a lateral integrally-mounted auxiliary rod 18 which can be used as a foot-piece in forcing the pointed end 12 and plate 16 in the ground. The upper end of the the rod or standard is denoted at 20 and is provided with a substantially U-shaped adapter bracket 22 having a bight portion 24 fixed to the rod so that the spaced leg portions 26 are disposed at right angles to the axis of the rod. This bracket serves to pivotally mount and cradle an open-ended sleeve 28, said sleeve being of requisite length and cross-section to accommodatingly and telescopingly receive the handgrip 30 of the fishing rod 32. Thus, the sleeve becomes a holder for the rod. The free lower end portion 34 of the sleeve has a notch 36 in one side which is aligned and engageable with the rod just below the level of the bracket. This end portion of the sleeve is pivotally mounted between the legs of the bracket as at 38. The aforementioned handle is denoted at 40 and is rigidly connected at 42 to a median portion of the sleeve. The handle extends at right angles to the sleeve and facilitates setting and operation of the over-all hooker. The free end portion of the handle (see FIG. 4 in particular) is denoted at 43 and is provided with an L-shaped member 44 having a cooperable pin 46 with which the upper elongated looped end or link portion 48 of a linking rod 50 is connected. This specially-constructed rod constitutes a trip member which is denoted generally by the numeral 52. The lower end thereof, as best shown in FIGS. 1 and 2, is provided with an eye 54 to which the upper end 56 of a heavy elastic band or "spring" is connected. More partciularly, the lower end portion 60 of the elastic band is adjustably connected as at 62 with a hold-down arm 64 carried by the standard just above the plate 16 and projecting at right angles from the standard. The trip member 52 and the associatively cooperable elastic band 58 conjointly provide an operating connection between the handle 40 and the lower end portion of the standard.

The standard is also provided adjacent the upper end portion with a right-angularly disposed guide member which is denoted by the numeral 66. This guide member comprises a bar having one end joined to the standard at the right in FIG. 1 and having a flat top surface 68 which guides a shiftably-mounted trigger 70. The trigger is J-shaped and comprises a rod-like finger 72 which has a laterally-directed end portion 74 which is detachably and pivotally connected with the lower end portion 34 of the aforementioned sleeve and is suitably held in place by a retaining nut and washer assembly as at 76. The hooked end of the trigger is denoted at 78 and is shiftable along the flat guide surface 68. This hook is cooperable with a keeper notch 80 which is provided in a free end portion of the guide member. This notch is so arranged that it accommodatingly and slidingly and removably seats a cooperating portion 82 of the trip rod 52. This construction and coaction of parts is brought out with particularity in FIG. 5 wherein it will be noted that the trip rod is engaged in the keeper notch or seat and the bend of the trigger hook 78 is operatively engageable with the trip rod and also the notched end portion of the guide. FIG. 5 shows the trip rod in its set position with the hook 78 in readiness to release the trip rod in a seemingly self-evident manner.

The portable automatic fish hooker is shown properly set up for use in FIG. 1 wherein it will be observed that the stand has been anchored in the ground, that the handgrip of the fishing rod has been placed in the holder sleeve 28. To set the device, the handle 40 is used in a seemingly evident manner and with the sleeve set the notch 36 is lined up with the upper end portion of the standard. This notch in actual practice can be lined with a compressibly resilient strip of rubber to allow slight play (not detailed). As is evident from FIG. 1, the operating connection requires that the trip member or link 52 assume an elevated position and serve to tension and stretch the elastic band 58. The bent portion of the hook 78 is in a position to exert end-thrust pressure against the eye-equipped lower end 82 of the trip rod 52. It follows that when the fish takes the fish hook (not shown) and exerts a slight pull on the rod, the sleeve or holder 28 is acted upon so that the lower end 34 is moved inwardly against the rod 10 with the result that the J-shaped trigger 70 is thrust against the trip rod 52 to release the trip from the notch 80. This permits the elastic band to pull the trip rod 52 downwardly and cause the rod 32 to be yanked from right to left to assume the fish-hooking position shown in FIG. 2.

It is submitted that a careful consideration of the views of the drawings, singly and collectively, in conjunction with the detailed description of the same will enable the reader to fully understand the construction of the stand 8 and the component parts which are carried thereby, the construction and purpose and function of the handle-equipped sleeve and the operating connection characterized by the trip member or rod 52 and elastic means 58. Accordingly, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable automatic fish hooker comprising, in combination, a stand embodying a vertically elongated standard having a lower end provided with anchoring and anti-turning means, a bracket fixedly and operatively mounted on the upper end of said standard, an elongated substantially-upstanding sleeve pivotally mounted adjacent to its lower end on said bracket and pivotal in a vertical plane, said sleeve being open at its upper end and providing a socket-type holder for an insertable and removable fishing rod handgrip, said sleeve having a rigid laterally disposed arm providing a manually manipulable holder setting handle, an extensible and retractable elastic element having a lower end operatively connected to a lower part of said standard, a trip member having an upper end operatively connected with a coacting free end portion of said arm and a lower end operatively connected with a coacting upper end of said elastic element, keeper means mounted on said standard for positioning and releasably retaining said trip member in a given set position, and a trigger having one end connected to said sleeve and its other end responsively oriented and releasably engageable with said keeper means and also said trip member.

2. The automatic fish hooker defined in and according to claim 1 and wherein said standard is provided at said lower end with a ground penetrating point, said anchoring and anti-turning means being affixed to said lower end above said point and comprising a plate having a V-shaped lower end portion adapted to be embedded in the ground.

3. The automatic fish hooker defined in and according to claim 1 and wherein said bracket is substantially U-shaped in plan and embodies a pair of spaced legs having like ends joined by a bight portion, said bight portion being superimposed upon and fixed to an upper end of said standard, the lower end portion of said sleeve being positioned between said legs, the extreme lower end portion of said sleeve depending below said bracket and having a terminal notched portion which, when the hooker is set, has abutting contact with that portion of the standard slightly below the plane of said bracket.

4. The automatic fish hooker defined in and according to claim 1 and wherein said arm is disposed in a position at right angles to the lengthwise axis of said sleeve and has one end fixedly joined to a medium portion of said sleeve, said arm being of a length that it can be caught hold of in a manner to conveniently set the hooker.

5. The automatic fish hooker defined in and according to claim 1 and wherein said elastic element comprises a heavy duty elastic band, the lower end of said band being connected to the lower part of said standard by way of a lateral attaching arm carried by a lower portion of the standard, said trip member comprising a rod having an upper end provided with an elongated loop-like link, said link being slidingly operatively connected to a cooperating free end portion of said arm, said rod having an eye at a lower end thereof connected to a cooperating upper end portion of said elastic element.

6. The structure defined in and according to claim 5 and wherein the means on said standard for positioning and releasably retaining said trip member comprises a guide bar having one end joined to an upper end portion of said standard, said guide bar providing a flat face and a free end portion provided with a keeper notch, said trip rod being slidingly and releasably cooperable with said keeper notch.

7. The automatic hooker defined in and according to claim 6 and wherein said trigger comprises a rigid finger having one end hingedly connected with the lower end of said sleeve and having its other end fashioned into a hook, said hook being slidable back and forth atop said guide bar and being movable toward and from said keeper notch in a manner to release said trip member from said keeper notch.

8. A portable automatic fish hooker comprising, in combination, a stand embodying a vertically elongated standard having a pointed lower end and an anchoring plate fixed to said lower end and adapted to be embedded in the ground in a manner to prevent turning of the standard when it is being used, a U-shaped bracket at right angles to and fixedly connected with an upper end portion of said standard and projecting in a predetermined direction and at right angles to the plane of said anchoring plate, a horizontally disposed guide bar having one end fixed to said standard below the plane of said bracket and having an outer end provided with a keeper notch, an elongated substantially-upstanding sleeve open at an upper end, said sleeve providing a socket type holder for an insertable and removable fishing rod handgrip, said sleeve having a lower end portion thereof cradled and pivotally mounted between the legs of said bracket for pivoting in a vertical plane and having a lower terminal end portion which is adapted to abut a portion of the standard below said bracket and above said guide bar, a substantially J-shaped trigger having one end pivotally conected to a lower end portion of said sleeve and the other end formed with a hook which is slidable back and forth on said guide bar, said sleeve being provided intermediate its ends with a right-angularly disposed arm constituting a setting handle, and an operating connection between the free end of said handle and a lower end portion of said standard.

9. The fish hooker defined in and according to claim 8 said operating connection comprising a linking rod having an upper end slidably connected with said handle, a lower end slidable in said keeper notch and releasably cooperable with said trigger, and an elastic band connected at an upper end to the lower end of said linking rod and a lower end secured to a lower end portion of said standard.

10. The fish hooker defined in and according to claim 8, said operating connection comprising a linking rod having an upper looped end providing a link portion, said link portion being slidably connected to a coacting free actuatable end portion of said handle, a lower end slidable in said keeper notch and releasably cooperable with the hook on said trigger, and an elastic band connected at an upper end to a lower end of said linking rod and lower end secured to a rigid hold-down arm provided therefor on a lower end portion of said standard.

References Cited

UNITED STATES PATENTS

| 2,744,351 | 5/1956 | Smith | 43—16 |
| 2,835,065 | 5/1958 | Schwartzkopf | 43—15 |
| 2,898,697 | 8/1959 | Housman | 43—15 |
| 2,964,868 | 12/1960 | Bennett | 43—15 |
| 3,055,136 | 9/1962 | Scott et al. | 43—15 |

SAMUEL KOREN, Primary Examiner

D. J. LEACH, Assistant Examiner